(12) United States Patent
Stevens

(10) Patent No.: US 6,369,459 B1
(45) Date of Patent: Apr. 9, 2002

(54) WEIGHT SENSING ANTI-THEFT VEHICLE SYSTEM

(76) Inventor: Larry A. Stevens, 6179 Harmingtown Rd., Machipongo, VA (US) 23405

( * ) Notice: Subject to any disclaimer, the term of this patent is extended or adjusted under 35 U.S.C. 154(b) by 0 days.

(21) Appl. No.: 09/397,259

(22) Filed: Sep. 16, 1999

(51) Int. Cl.[7] .............................................. B60R 25/04
(52) U.S. Cl. ..................................... 307/10.3; 307/10.6
(58) Field of Search .............................. 307/10.2–10.6, 307/10 AT; 340/667, 825.31, 426; 180/273, 287; 123/179.3, 179.4, 179 B; 177/50; 701/2

(56) References Cited

U.S. PATENT DOCUMENTS

| | | | | |
|---|---|---|---|---|
| 4,553,511 A | * | 11/1985 | Hayakawa et al. | 123/179 B |
| 4,682,062 A | * | 7/1987 | Weinberger | 307/10 AT |
| 4,852,680 A | * | 8/1989 | Brown et al. | 180/287 |
| 5,006,843 A | * | 4/1991 | Hauer | 340/825.31 |
| 5,023,591 A | * | 6/1991 | Edwards | 340/426 |
| 5,123,494 A | * | 6/1992 | Schneider | 177/50 |
| 5,353,006 A | * | 10/1994 | Aguilar | 340/426 |
| 5,494,130 A | * | 2/1996 | Foster | 180/287 |
| 5,736,935 A | * | 4/1998 | Lambropoulos | 340/825.69 |
| 5,828,297 A | * | 10/1998 | Banks et al. | 340/426 |
| 5,835,868 A | * | 11/1998 | McElroy et al. | 701/2 |
| 5,986,221 A | * | 11/1999 | Stanley | 177/136 |

* cited by examiner

Primary Examiner—Josie Ballato
Assistant Examiner—Sharon Polk

(57) ABSTRACT

A weight sensing anti-theft vehicle system for preventing theft and carjacking of vehicles. The weight sensing anti-theft vehicle system includes weight sensors comprising a mat, a microprocessor unit connected to the weight sensors for controlling the starting and stopping of a vehicle, a keypad data entry device for entering the weight of the driver into the microprocessor unit, a power source such as a battery connected to the microprocessor unit, and an ignition coil also connected to the microprocessor unit which turns on and off the engine if no weight is detected by the weight sensors and if the correct weight is not keyed into the microprocessor unit.

1 Claim, 3 Drawing Sheets

WEIGHT SENSING ANTI-THEFT VEHICLE SYSTEM

BACKGROUND OF THE INVENTION

1. Field of the Invention

The present invention relates to a means for preventing vehicle theft by sensing the driver'weight and more particularly pertains to a new weight sensing anti-theft vehicle system for preventing theft and carjacking of vehicles.

2. Description of the Prior Art

The use of a means for preventing vehicle theft by sensing the driver's weight is known in the prior art. More specifically, means for preventing vehicle theft by sensing the driver's weight heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,189,708; 5,805,055; 5,585,779; 5,644,172; 3,691,396; and 3,611,287.

While these devices fulfill their respective, particular objectives and requirements, the aforementioned patents do not disclose a new weight sensing anti-theft vehicle system. The inventive device includes weight sensors comprising a mat, a microprocessor unit connected to the weight sensors for controlling the starting and stopping of a vehicle, a keypad data entry device for entering the weight of the driver into the microprocessor unit, a power source such as a battery connected to the microprocessor unit, and an ignition coil also connected to the microprocessor unit which turns on and off the engine if no weight is detected by the weight sensors and if the correct weight is not keyed into the microprocessor unit.

In these respects, the weight sensing anti-theft vehicle system according to the present invention substantially departs from the conventional concepts and designs of the prior art, and in so doing provides an apparatus primarily developed for the purpose of preventing theft and carjacking of vehicles.

SUMMARY OF THE INVENTION

In view of the foregoing disadvantages inherent in the known types of means for preventing vehicle theft by sensing the driver's weight now present in the prior art, the present invention provides a new weight sensing anti-theft vehicle system construction wherein the same can be utilized for preventing theft and carjacking of vehicles.

The general purpose of the present invention, which will be described subsequently in greater detail, is to provide a new weight sensing anti-theft vehicle system and method which has many of the advantages of the means for preventing vehicle theft by sensing the driver's weight mentioned heretofore and many novel features that result in a new weight sensing anti-theft vehicle system which is not anticipated, rendered obvious, suggested, or even implied by any of the prior art means for preventing vehicle theft by sensing the driver's weight, either alone or in any combination thereof.

To attain this, the present invention generally comprises weight sensors comprising a mat, a microprocessor unit connected to the weight sensors for controlling the starting and stopping of a vehicle, a keypad data entry device for entering the weight of the driver into the microprocessor unit, a power source such as a battery connected to the microprocessor unit, and an ignition coil also connected to the microprocessor unit which turns on and off the engine if no weight is detected by the weight sensors and if the correct weight is not keyed into the microprocessor unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new weight sensing anti-theft vehicle system and method which has many of the advantages of the means for preventing vehicle theft by sensing the driver's weight mentioned heretofore and many novel features that result in a new weight sensing anti-theft vehicle system which is not anticipated, rendered obvious, suggested, or even implied by any of the prior art means for preventing vehicle theft by sensing the driver's weight, either alone or in any combination thereof.

It is another object of the present invention to provide a new weight sensing anti-theft vehicle system which may be easily and efficiently manufactured and marketed.

It is a further object of the present invention to provide a new weight sensing anti-theft vehicle system which is of a durable and reliable construction.

An even further object of the present invention is to provide a new weight sensing anti-theft vehicle system which is susceptible of a low cost of manufacture with regard to both materials and labor, and which accordingly is then susceptible of low prices of sale to the consuming public, thereby making such weight sensing anti-theft vehicle system economically available to the buying public.

Still yet another object of the present invention is to provide a new weight sensing anti-theft vehicle system which provides in the apparatuses and methods of the prior art some of the advantages thereof, while simultaneously overcoming some of the disadvantages normally associated therewith.

Still another object of the present invention is to provide a new weight sensing anti-theft vehicle system for preventing theft and carjacking of vehicles.

Yet another object of the present invention is to provide a new weight sensing anti-theft vehicle system which includes weight sensors comprising a mat, a microprocessor unit connected to the weight sensors for controlling the starting and stopping of a vehicle, a keypad data entry device for entering the weight of the driver into the microprocessor unit, a power source such as a battery connected to the microprocessor unit, and an ignition coil also connected to the microprocessor unit which turns on and off the engine if no weight is detected by the weight sensors and if the correct weight is not keyed into the microprocessor unit.

Still yet another object of the present invention is to provide a new weight sensing anti-theft vehicle system that starts and stops the engine of a vehicle based upon the correct weight of the driver.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
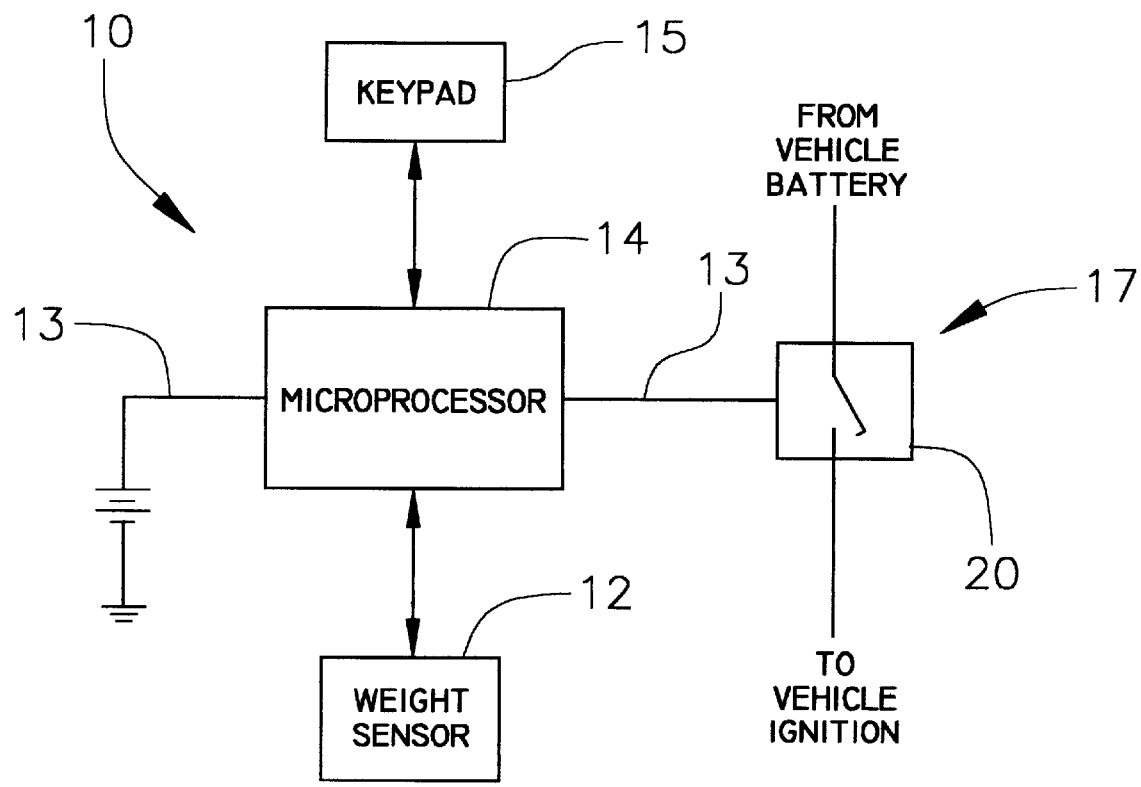
FIG. 1 is a schematic view of a new weight sensing anti-theft vehicle system according to the present invention.
Figure 2:
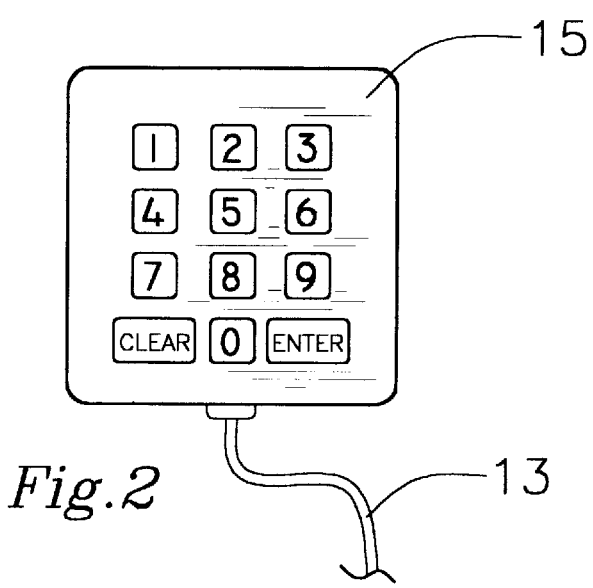
FIG. 2 is a detailed view of the keypad data entry device of the present invention.
Figure 3:
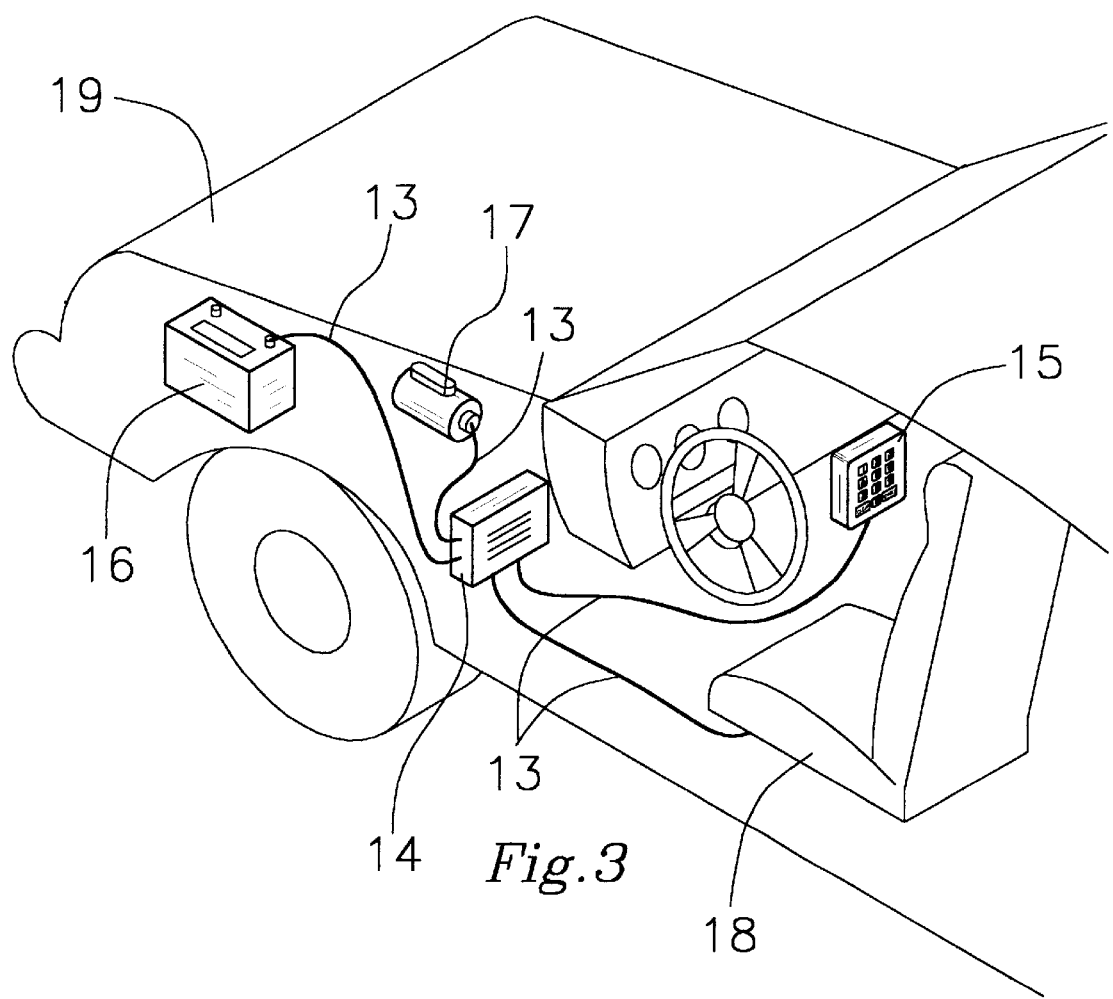
FIG. 3 is a perspective view of the present invention disposed in a vehicle.
Figure 4:
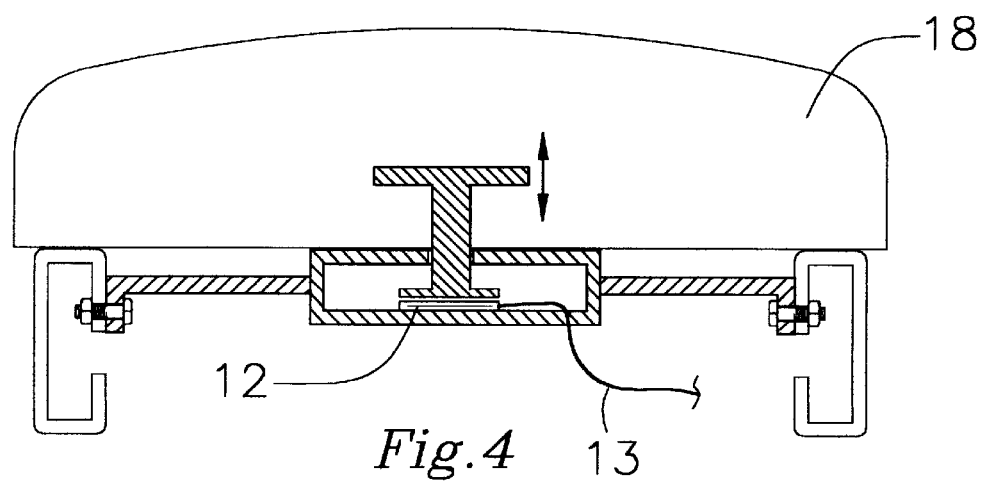
FIG. 4 is a cross-sectional view of the weight sensor means of the present invention in a driver's seat.
Figure 5:
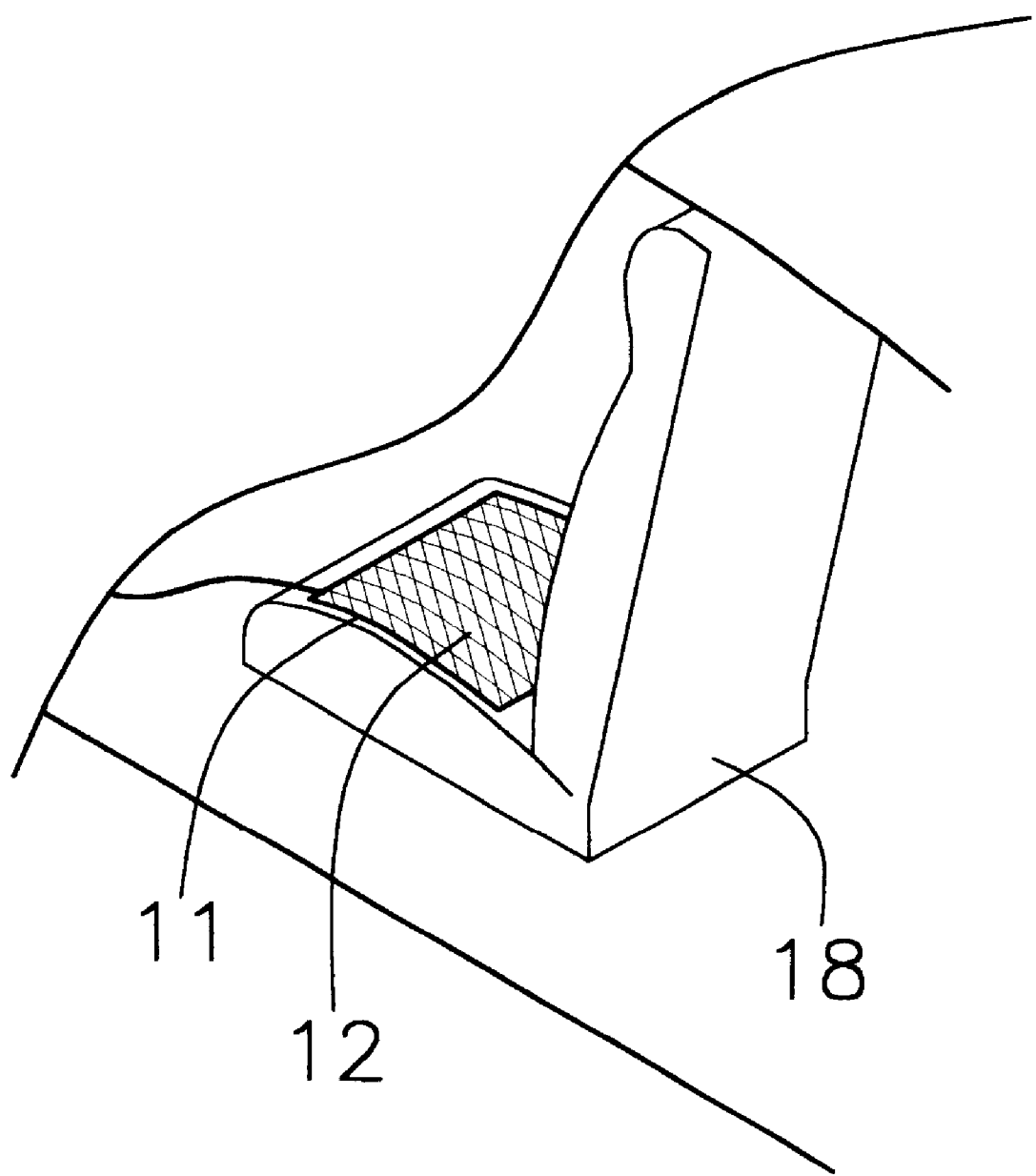
FIG. 5 is a perspective view of another embodiment of the present invention disposed in a vehicle.

With reference now to the drawings, and in particular to FIGS. 1 through 5 thereof, a new weight sensing anti-theft vehicle system embodying the principles and concepts of the present invention and generally designated by the reference numeral 10 will be described.

As best illustrated in FIGS. 1 through 5, the weight sensing anti-theft vehicle system 10 generally comprises a means for detecting the weight of the driver which includes a conventional weight sensor means adapted to conventionally mount to a driver's seat 18 of a vehicle 19. A microprocessor means is connected to the weight detecting means for controlling the running of and shutting off a vehicle 19. The weight sensor means includes a mat 11 having a plurality of weight sensors 12 connected to and dispersed throughout the mat 11 which is adapted to be conventionally disposed in the driver's seat 18 of a vehicle 19 and which is connected with wires 13 to the microprocessor means. The microprocessor means includes a microprocessor unit 14 connected to the mat 11, and also includes a keypad data entry device 15 connected to the microprocessor unit 14 with wires 13 and is adapted to be mounted in a passenger compartment of a vehicle 19 for entering the weight of the driver. A power source 16 is connected to the microprocessor unit 14 with wires 13. The power source is a battery 16 and is connected to the microprocessor unit 14. An ignition means 17 is connected to the microprocessor unit 14 for starting and stopping a vehicle and includes a switch 20 operatively coupled to the microprocessor unit that is wired between the vehicle battery and an ignition coil of the vehicle.

In use, the user keys in his/her weight into the microprocessor unit 14 using the keypad data entry device 15 which starts the engine and keeps the engine running as long as weight is detected by the weight sensor means which is transmitted to the microprocessor unit 14. If the weight sensor means fails to detect the weight of the driver and the driver fails to input his/her weight, the microprocessor unit 14 will cut off power to the ignition system 17, which has the effect of preventing engine operation if the engine is off or stops engine operation if the engine is running.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. Weight sensing anti-theft vehicle system comprising:
    a weight sensor means for sensing the weight of a driver seated in a driver's seat of a vehicle, said weight sensing means being mounted to a driver's scat of the vehicle, said weight sensor means producing a weight signal corresponding to the wright sensed by said weight sensor means;
    a microprocessor means connected to said weight sensor means for controlling the running of and shutting off an engine of a vehicle; and
    an ignition means for selectively preventing the starting of an engine of the vehicle and for selectively stopping operation of the engine of said vehicle, the ignition means being connected to said microprocessor means;
    wherein said weight sensor means includes a mat having a plurality of weight sensors connected to and dispersed throughout said mat, said mat being disposed in the driver's seat of the vehicle said weight sensor means being connected to said microprocessor means for sending said weight signal to said microprocessor means;
    wherein said microprocessor means includes a microprocessor unit connected to said mat and a memory circuit connected to said microprocessor unit for storing weights of persons authorized to operate the vehicle and a preprogrammed access code assigned to each of the persons authorized to operate the vehicle, and also includes a keypad data entry device connected to said microprocessor unit, said keypad data entry device being mounted in a passenger compartment of the vehicle for permitting entry of the weight of a person authorized to be a driver of the vehicle and the preprogrammed access code to be detected by said microprocessor unit, said microprocessor unit stopping operation of the engine of a vehicle through said ignition means if said weight sensing means discontinues sending said weight signal to said microprocessor means and indicating that the driver has moved from the driver's seat of said vehicle; and a power source connected to said microprocessor unit.

\* \* \* \* \*